United States Patent [19]

Kurpanek et al.

[11] Patent Number: 5,603,004
[45] Date of Patent: Feb. 11, 1997

[54] METHOD FOR DECREASING TIME PENALTY RESULTING FROM A CACHE MISS IN A MULTI-LEVEL CACHE SYSTEM

[75] Inventors: Gordon Kurpanek, Sunnyvale, Calif.; Eric Delano, Fort Collins; Michael A. Buckley, Windsor, both of Colo.; William R. Bryg, Saratoga, Calif.

[73] Assignee: Hewlett-Packard Company, Palo Alto, Calif.

[21] Appl. No.: 196,042

[22] Filed: Feb. 14, 1994

[51] Int. Cl.$^6$ .............................. G06F 12/00; G06F 12/12
[52] U.S. Cl. ..................... 395/445; 395/449; 395/471; 395/460; 395/450
[58] Field of Search ...................... 395/449, 455, 395/464, 465, 470, 471, 445, 446, 447, 460, 461, 466, 435, 437, 463, 450, 448, 472

[56] References Cited

U.S. PATENT DOCUMENTS

| | | | |
|---|---|---|---|
| 4,774,654 | 9/1988 | Pomerene et al. | 395/449 |
| 4,928,239 | 5/1990 | Baum et al. | 395/463 |
| 5,058,006 | 10/1991 | Durdan et al. | 395/449 |
| 5,146,578 | 9/1992 | Zangenehpour | 395/449 |
| 5,261,066 | 11/1993 | Jouppi et al. | 395/455 |
| 5,307,477 | 4/1994 | Taylor et al. | 395/449 |
| 5,317,718 | 5/1994 | Jouppi et al. | 395/464 |
| 5,327,547 | 7/1994 | Stiles et al. | 395/464 |
| 5,369,753 | 11/1994 | Tipley | 395/449 |

FOREIGN PATENT DOCUMENTS

0449540A3  10/1991  European Pat. Off. .

OTHER PUBLICATIONS

David A. Patterson, John L. Hennessy, *Computer Architecture A Quantitative Approach*, Morgan Kauffman Publishers, Inc., San Mateo, California, 1990, pp. 404–423, 453–464.

Norman P. Jouppi, *Improving Direct–Mapped Cache Performance by the Addition of a Small Fully-Associative Cache and Prefetch Buffers*, Proceedings 17th ISCA, May 1990, pp. 364–373, Seattle, WA.

*Primary Examiner*—Jack B. Harvey
*Assistant Examiner*—Ario Etienne

[57] ABSTRACT

A cache system buffers data stored in a main memory and utilized by a processor. The cache system includes a first cache, a second cache, a first transfer channel, a second transfer channel and a third transfer channel. The first cache is fully associative. The second cache is directly mapped. The first transfer channel transfers data lines from the main memory to the first cache. The second transfer channel transfers data lines from the first cache to the second cache. The third transfer channel transfers data lines from the second cache to the main memory. Accesses of data lines from the first cache and the second cache are performed in parallel.

29 Claims, 4 Drawing Sheets

METHOD FOR DECREASING TIME PENALTY RESULTING FROM A CACHE MISS IN A MULTI-LEVEL CACHE SYSTEM

BACKGROUND

The present invention concerns a method for decreasing time penalty resulting from a cache miss in a multi-level cache system.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory many computer systems include a cache memory between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks of one or more words of data. Each block has associated with it an address tag that uniquely identifies which block of main memory it is a copy of. Each time the processor makes a memory reference, an address tag comparison is made to see if a copy of the requested data resides in the cache memory. If the desired memory block is not in the cache memory, the block is retrieved from the main memory, stored in the cache memory and supplied to the processor.

In addition to using a cache memory to retrieve data from main memory, the CPU may also write data into the cache memory instead of directly to the main memory. When the processor desires to write data to the memory, the cache memory makes an address tag comparison to see if the data block into which data is to be written resides in the cache memory. If the data block exists in the cache memory, the data is written into the data block in the cache memory. In many systems a data "dirty bit" for the data block is then set. The dirty bit indicates that data in the data block is dirty (i.e., has been modified), and thus before the data block is deleted from the cache memory the modified data must be written into main memory. If the data block into which data is to be written does not exist in the cache memory, the data block must be fetched into the cache memory or the data written directly into the main memory. A data block which is overwritten or copied out of cache memory when new data is placed in the cache memory is called a victim block or a victim line.

In some applications a second cache memory is added in series between the first cache memory and the main memory. The first cache memory typically has a subset of the data in the second cache memory. Similarly, the second cache memory typically has a subset of the data in the main memory. Accessed data is first searched for in the first cache memory. If there is a miss in the first cache memory, the accessed data is searched for in the second cache memory. If there is a miss in the second cache memory, the data is fetched from the main memory.

In one arrangement of a two level cache for a processor system, the first level cache is a proper subset of the second level cache. What is meant by a proper subset is that all entries in the first level cache are also in the second level cache. The second level cache has additional entries that are not in the first level cache. It is also smaller and closer to the processor than a second level cache. Because it is smaller and closer to the processor, a first level cache can, in general, offer improved performance because it has a smaller access latency than its companion second level cache or even that of memory.

In normal operation there are several different actions that may be necessary to satisfy some memory reference. A memory reference is generally a load or store instruction. First, simplest, and fastest, the reference might hit in the first level cache. A hit is defined as when the data for a desired memory address is present in the cache being checked (first level or second level). A miss is defined to be a memory reference where the data for a desired memory address is not present in the cache being checked (first level or second level). When there is a hit in the first level cache, there is a zero cycle penalty, and the reference is completed without a processing penalty.

The next fastest case is a first level cache miss that happens to hit in the second level cache. This causes a sequence of operations to be performed to fill a single first level cache line with the appropriate sixteen byte quantity from the second level cache. Data is subsequently supplied to the processor or the store completes. This is a medium speed operation, and the processor will be frozen while it waits for the memory reference to be satisfied.

The slowest operation is when the memory reference misses both the first level and second level caches. In this instance, a long sequence of operations is initiated to bring the relevant line from main memory into the second level cache. When this data is returned from memory and copied into the second level cache, the first level cache is again referenced, resulting, this time, in a first level cache miss that now hits in the second level cache. This causes the relevant portion of the second level cache line to be written into the first level cache, and subsequently the requested data is supplied to the processor, or the store completes.

Typically, cache memories are direct mapped. That is, an index is used to access one or more entries in the cache. The tag for the entry is then compared with the tag portion of the address to determine whether a match has occurred.

In a multi-way set-associative cache, a single index is used to simultaneously access a plurality of data random access memories (RAMs). A data RAM may be implemented by one or more physical random access memory integrated circuits. A set is a collection of all lines addressed by a single cache index. The number of data RAMs addressed by a single cache index indicates the way number of a cache. For example, if in a cache a single cache index is used to access data from two data RAMs, the cache is a two-way set-associative cache. Similarly, if in a cache a single cache index is used to access data from four data RAMs, the cache is a four-way set-associative cache.

When a multi-way access is made, a tag comparison is made for each data RAM. If a tag comparison indicates the desired data block is in a particular data RAM the operation is performed on/with data from that particular data RAM.

In a fully associative cache, no index is used. When an access is made to a fully associative cache, a tag comparison is made for each cache line within the fully associative cache. If a tag comparison indicates the desired data line is in the cache, the operation is performed on/with data from that particular data line.

For a general discussion of cache systems, see for example, David A. Patterson, John L. Hennessy, *Computer Architecture A Quantitative Approach*, Morgan Kauffman Publishers, Inc., San Mateo, Calif., 1990, pp. 404 through 423 and 454 through 464.

In one prior art system, a fully associative victim cache receives victim lines from a larger direct mapped cache. When there is a miss in the direct mapped cache, the fully associative victim cache may sometimes be found in the fully associative victim cache. See, Norman P. Jouppi, Improving Direct-Mapped Cache Performance by the Addition of a Small Fully-Associative Cache and Prefetch Buffers, *Proceedings 17th ISCA*, May 1990, pp. 364–373, Seattle, Wash.

SUMMARY OF THE INVENTION

In accordance with the preferred embodiment of the present invention, a cache system buffers data stored in a main memory and utilized by a processor. The cache system includes a first cache, a second cache, first transfer means, second transfer means, third transfer means, and an access means. The first cache is fully associative. The second cache is directly mapped. The first transfer means transfers data lines from the main memory to the first cache. The second transfer means transfers data lines from the first cache to the second cache. The third transfer means transfers data lines from the second cache to the main memory. Accesses of data lines from the first cache and the second cache are performed in parallel.

In the preferred embodiment of the present invention, a hash function is used to generate an index into the second cache. A tag for a data line accessed by the index is compared with a tag for a desired data line to determine whether there has been a hit in the second cache.

For every data access to the first cache, the tags for all data lines in the first cache are checked to determine whether there is a hit. A content addressable memory stores tags for the first cache. The data lines are stored by the first cache in a first-in-first-out memory.

Additionally, in the preferred embodiment, stored with each data line in the first cache is an indication which indicates a destination for the data line when the data line is moved out of the first cache. The indication indicates whether the data line is to be moved to the second cache or moved to the main memory.

Also, in the preferred embodiment, to allow room for data to be prefetched into the first cache, data lines are moved out of the first cache two at a time when the first cache contains more than a predetermined number of data lines. When the two data lines map to a same location in the second cache, one of the two data lines will be moved to the main memory.

For example, for certain types of data accesses the processor will generate a prefetch address to be used if there is a cache miss, or if there is a hit on a data line in the first cache where a reference bit for the "hit" data line is set to zero. If the data line for the prefetch address is already in the first or second cache no further action need be taken. If the data line for the prefetch address is not already in one of the caches, the data line for the prefetch address will be prefetched. The reference bit for a prefetch data line is cleared (i.e., set to zero), indicating the prefetched data line was unreferenced. When there is a cache hit on a data line in the first cache that is marked "unreferenced" the reference bit will then be set to one indicating that the data line has now been referenced. In the preferred embodiment, when there is a cache hit on a data line in the first cache that is marked "unreferenced" and a prefetch address has been generated, if the data line for the prefetch address is not in one of the caches, the data line for the prefetch address will be prefetched from the main memory and placed in the first cache. The reference bit for the prefetched data line is cleared, indicating the prefetched data line was unreferenced.

The preferred embodiment of the present invention eliminates thrashing behavior typically associated with direct mapped caches with the addition of only a minimal amount of hardware.

DESCRIPTION OF THE PREFERRED EMBODIMENT

Figure 1:
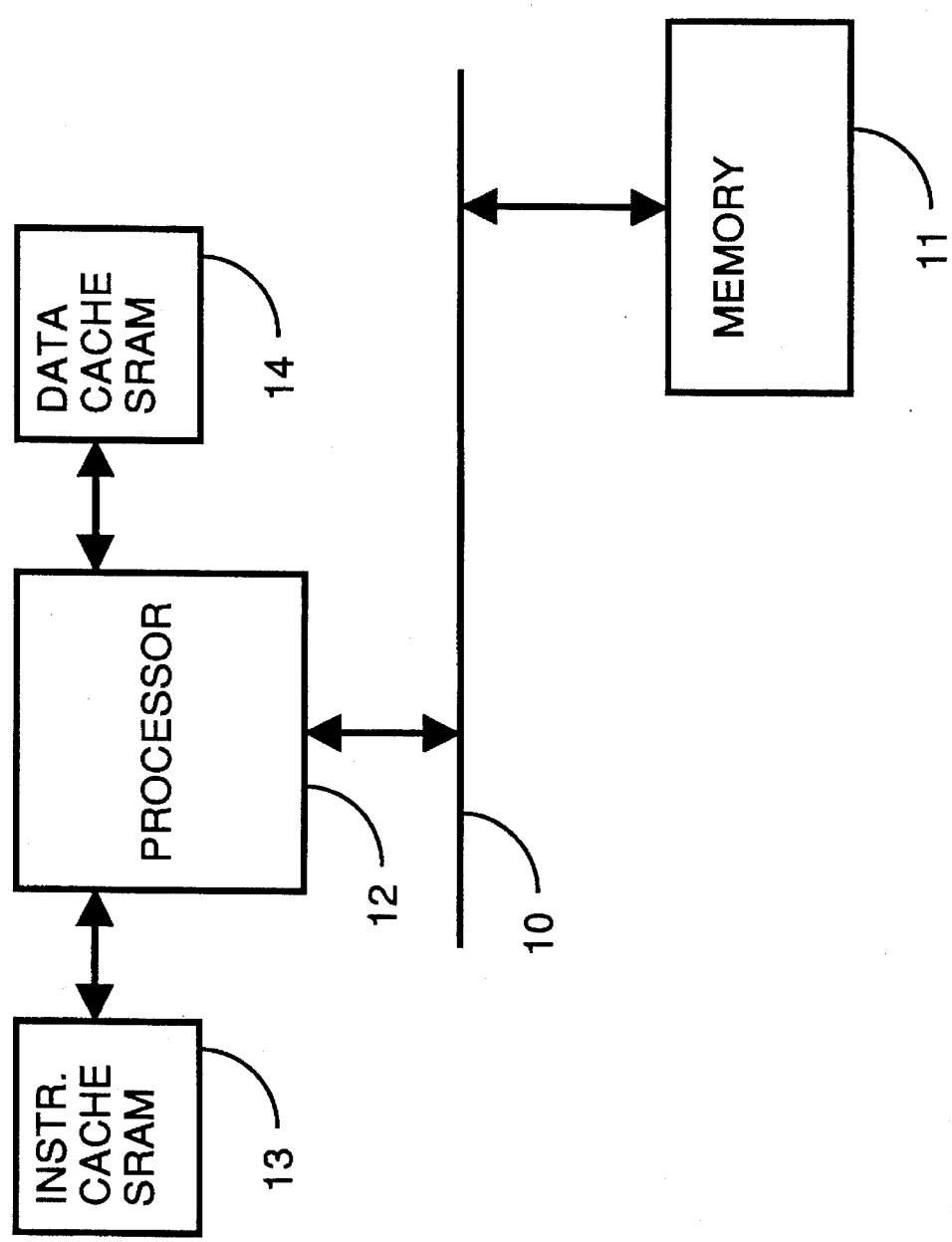
FIG. 1 shows a simplified block diagram of a computer system with a instruction cache and a data cache, in accordance with a preferred embodiment of the present invention.

FIG. 1 shows a simplified block diagram of a computer system. A processor 12 and a memory 11 are shown connected to a bus 10. Processor 12 utilizes a instruction cache 13 and a data cache 14. Instruction cache 13 stores instructions for processor 12 in static random access memory (SRAM). Data cache 14 stores data for processor 12 in SRAM.

Figure 2:
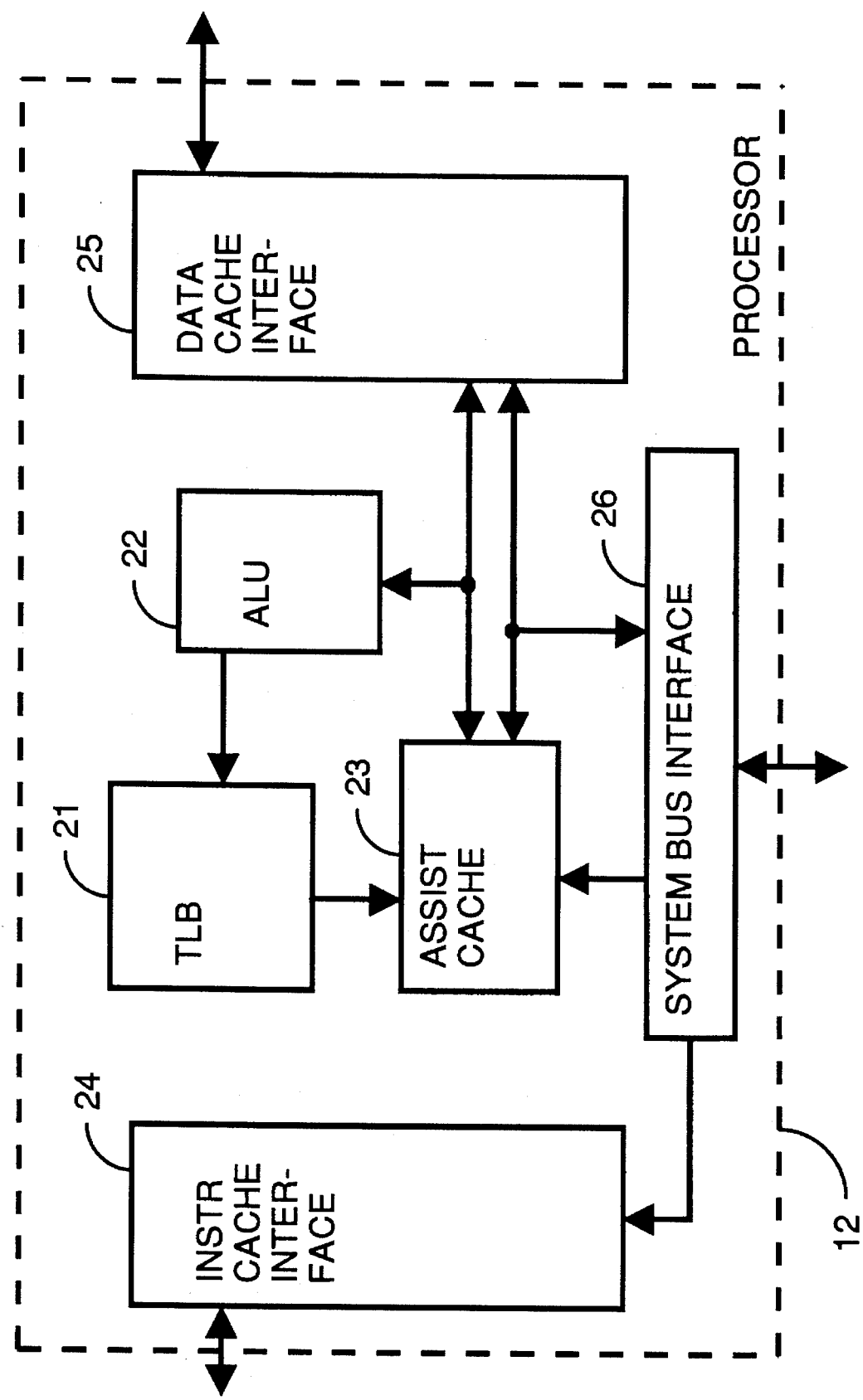
FIG. 2 shows a simplified block diagram of a processor shown in FIG. 1, in accordance with a preferred embodiment of the present invention.

FIG. 2 shows a simplified block diagram of processor 12. Processor 12 is shown to include system bus interface logic 26, instruction cache interface logic 24, data cache interface logic 25, an arithmetic logic unit (ALU) 22, a translation look aside buffer (TLB) 21, and an assist cache 23. System bus interface logic 26 provides processor 12 with an interface to system bus 10. Instruction cache interface logic 24 provides processor 12 with an interface to instruction cache 13. Data cache interface logic 25 provides processor 12 with an interface to data cache 14. As is described in more detail below, assist cache 23 is used in parallel with data cache 14 to provide data to arithmetic logic unit 22. Translation look aside buffer 21 is used to map virtual addresses to real addresses in order to generate cache tags to be used to access to data stored within assist cache 23 and within data cache 14.

Figure 3:
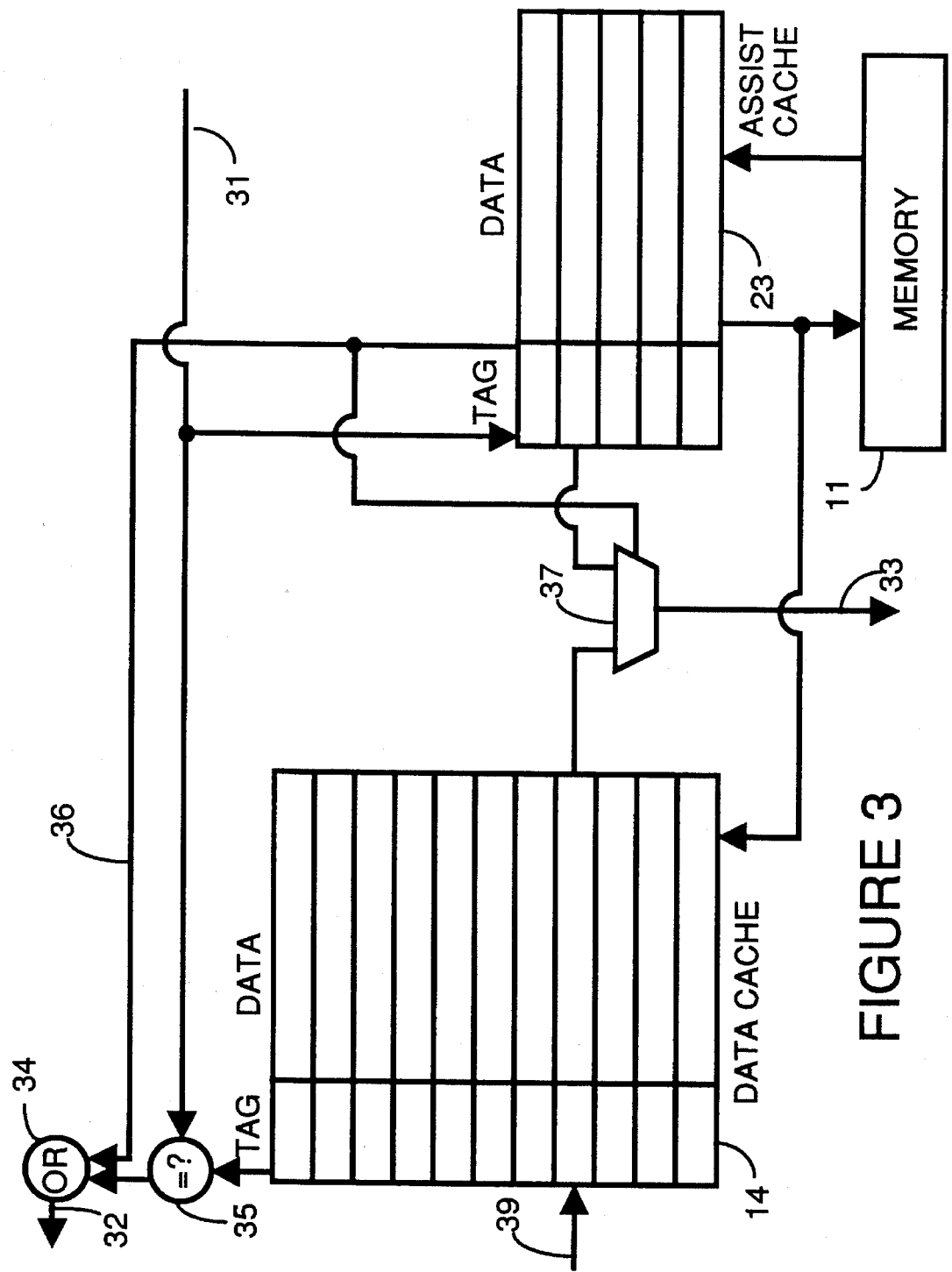
FIG. 3 shows a simplified block diagram of the cache system for data for the computer system shown in FIG. 1 in accordance with the preferred embodiment of the present invention.

FIG. 3 shows the organization for the data cache system. In the preferred embodiment, assist cache 23 consists of 64 fully-associative 32-byte cache lines. Assist cache 23 stores tags in a content-addressable-memory (CAM) which allows a portion of an address to be matched with each entry's tag. In the preferred embodiment, data cache 14 is direct mapped and consists of up to 1 megabytes of data (32K 32-byte cache lines).

For each cache access, both data cache 14 and assist cache 23 are accessed in parallel. The real address accessed from TLB 21 (shown in FIG. 2) is used to generate an assist cache access tag for access into assist cache 23. If there is a match of the assist cache access tag with the tag for any data line within assist cache 23, a hit is generated on a data line 36. The hit signals a selector 37 to select the "hit" data from assist cache and place the hit data on a data path 33.

Simultaneous to the access of assist cache 23, an index 39 is used to access a single data line within data cache 14. In the preferred embodiment, the index consists of a hashed value derived from hashing a portion of the virtual address for the accessed memory location. An address tag for the indexed location in data cache 14 is compared with a portion of the real address of the accessed memory location placed on data lines 31. The comparison is represented by comparison logic 35. If there is a hit from either assist cache 23 or data cache 14, logic 34 generates a hit signal on a hit data line 32.

When there is a miss from both data cache 14 and assist cache 23, a new data line is fetched from main memory 11. Data lines are moved in and out of assist cache 23 in first-in-first-out (FIFO) order. All data lines requested from main memory 11 are moved into assist cache 23. When a data line is to be removed from assist cache 23, the data line is moved out to either data cache 14 or back to main memory 11. The determination of whether to move a data line from assist cache 23 to either data cache 14 or back to main memory 11 depends on the value of an allocate bit stored with the data line in assist cache 23. The value of the allocate bit is determined by the instruction that caused the data line to be brought into assist cache 23, and whether that instruction had a "No-allocate" cache hint specified in the cache hint sub-operation field. For example, in the preferred embodiment, short displacement loads and stores and indexed loads and stores have a cache hint sub-operation field.

If a load or store instruction with the "no-allocate" cache hint misses the cache, both the accessed data line and any prefetched data line will be brought into assist cache 23 with its allocate bit cleared (i.e., set to zero), indicating "no-allocate". In addition, if a data access with the "no allocate" cache hint specified results in a hit on a data line in assist cache 23 where the reference bit is cleared (see below), thus causing a prefetch (as discussed further below), that preferred data line will be brought into assist cache 23 with the allocate bit cleared to zero, indicating "no allocate". All other data lines are brought into assist cache 23 with the allocate bit set to one indicating "allocate".

When a data line in assist cache 23 is up for replacement, the allocate bit is checked to determine whether the data line is to be moved to data cache 14 or to main memory 11 (if dirty). If the allocate bit for the data line is set to one, the data line is moved to data cache 14. If the allocate bit is set to zero, the data line is moved to main memory 11 if it is dirty (i.e., if it has been modified since being brought into assist cache). If the data line is not dirty, it may be discarded without being written back to main memory 11.

For example, data lines within assist cache 23 are marked as "no allocate" when the data is not expected to be used for a long period of time, but other pieces of data within the same data line of the data may be used in a short period of time. For more information on cache hints, U.S. Pat. No. 4,928,239 issued to William R. Bryg et al., for *Cache Memory with Variable Fetch and Replacement Schemes*. When a data line in data cache 14 is up for replacement, the allocate bit is checked to determine whether the data line is to be moved to data cache 14 or to main memory 11.

Moving data lines into assist cache 23 before moving them into data cache 14 eliminates the thrashing behavior typically associated with direct mapped caches. For example, in the vector calculation:

for i:=0 to N do

A[i]:=B[i]+C[i]+D[i]

if elements A[i], B[i], C[i] and D[i] map to the same cache index, then a direct mapped cache alone would thrash on each element of the calculation. This would result in 32 cache misses for eight iterations of this loop. With an assist cache, however, each data line is moved into the cache system without displacing the others. Assuming sequential 32 bit data elements, eight iterations of the loop causes only the initial 4 cache misses. Note that larger caches do not reduce this type of cache thrashing. While modern compilers are often able to re-align data structures to reduce or eliminate thrashing, sufficient compile time information is not always available in an application to make the correct optimization possible. With minimal hardware, the assist cache 23 is excellent at eliminating cache thrashing without compiler optimizations.

Entries within assist cache 23 are ordered in a circulating FIFO queue. New data lines requested from main memory 11 due to a cache miss or a prefetch are placed at the top of the queue and old entries are moved out the bottom. Flushes and purges to data lines in the FIFO queue cause bubbles (empty slots) which are removed as the queue circulates. An attempt is made to maintain a three quarter full FIFO. Therefore, a number of data lines which can be hidden under a typical miss latency are moved out of assist cache 23 during a miss until the FIFO has less than 48 entries. In the preferred embodiment, for each miss, the latency will allow two data lines to be moved out of assist cache 23.

In the preferred embodiment, assist cache 23 is optimally only three-fourths full in order to allow room for data to be prefetched into assist cache 23 without requiring additional machine cycles to move data lines out of assist cache 23 to make room for the prefetched data lines.

For example, in the preferred embodiment, as described further below, data lines may be prefetched into assist cache 23 from main memory 11. When assist cache 23 is full and there is a prefetched data line to be stored in assist cache 23, one data line is moved out of assist cache 23. No data lines, however, need be moved when assist cache 23 is not completely full. In order to make room, in advance, for prefetched data, when a miss is encountered and assist cache 23 is greater than or equal to three quarters full (i.e. there are greater than or equal to 48 entries between the beginning and end of the FIFO including any bubbles) then two data lines are moved out of assist cache 23.

In addition, as described further below, prefetched data can be brought into assist cache 23 on a cache miss. For example, on a cache miss the processor checks to see whether the following data line is already in the cache. If it isn't the processor will fetch the missing data line, and in addition, will prefetch the following data line.

In the preferred embodiment, if a cache miss requires a single data line to be fetched from main memory 11 (i.e., there is to be no prefetch of a second data line) and assist cache 23 is more than three quarters full, then two data lines are moved out of assist cache 23. The data lines can be moved out during the miss latency while processor 12 is stalled waiting for data to be returned from main memory 11.

A subsequent prefetch hit will benefit because the processor avoids stalling because no line needs to be moved out to make room.

Data lines are moved to data cache 14 in FIFO order, with the following exception. If two data lines are being moved out of the assist cache 23 on a miss and they both map to the same index in data cache 14, then the first data line is moved to data cache 14 and the second data line is flushed back to main memory 11.

Figure 4:
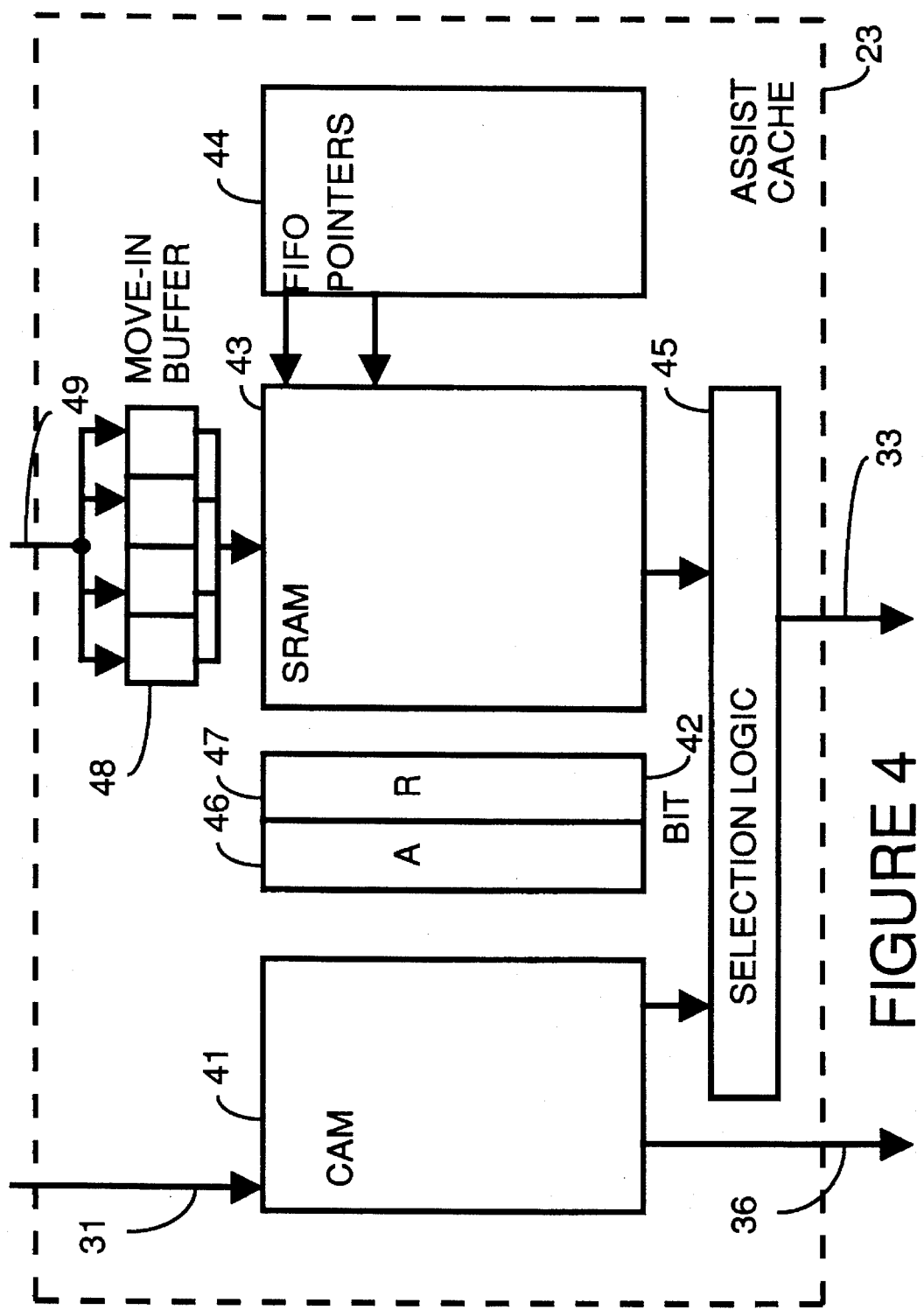
FIG. 4 shows a simplified block diagram of an assist cache within the processor shown in FIG. 2 in accordance with the preferred embodiment of the present invention.

FIG. 4 shows a simplified block diagram of assist cache 23. An SRAM 43 is used to store data lines. A content addressable memory (CAM) 41 is used to store tags for the data lines stored in SRAM 43. A bit memory 42 is used to store various cache control bits. The cache control bits stored with each data line include the allocate bit (represented by a column 46) discussed above and a reference bit (represented by a column 47) discussed below. The determination of whether to move a particular data line from assist cache 23 to either data cache 14 or back to main memory 11 depends on the value of the allocate bit stored for the particular data line. FIFO pointers 44 indicate the location of the first and last entry in SRAM 43 to facilitate implementation of SRAM as a FIFO memory. When assist cache is accessed and CAM 41 detects there is a cache hit, selection logic 45, provides the correct data line to data path 33.

In the preferred embodiment, if an access to data cache 14 and assist cache 23 results in a miss in both caches, processor 12 will request the "missed" data line from main memory 11. When the missed data line is brought into assist cache 23 from main memory 11, the reference (R) bit in column 47 for the data line is set, indicating the data line was referenced.

In addition, for certain types of data accesses, processor 12 will generate a prefetch address to be used if there is a cache miss, or if there is a hit on a data line in the assist cache 14 where the reference bit for the "hit" data line is set to zero. In general, the prefetch address generated by processor 12 is the data line following the accessed data line.

On a cache miss, if the data line for the prefetch address is already in data cache 14 or assist cache 23, no further action need be taken. If the data line for the prefetch address is not already in data cache 14 or assist cache 23, the data line for the prefetch address will be prefetched. When the prefetched data line is brought into assist cache 23 from main memory 11, the reference (R) bit in column 47 for the new data line is cleared, indicating the prefetched data line was unreferenced.

In the preferred embodiment, when there is a cache hit on a data line in assist cache 23 that is marked "unreferenced" (i.e., the reference bit in column 47 for the entry is cleared) and processor 12 has generated a prefetch address, processor 12 will set the reference bit in column 47 for the data line indicating that the data line has now been referenced. In addition, processor 12 will check whether the data line for the prefetch address is already in data cache 14 or assist cache 23. If not, the data line for the prefetch address will be prefetched. When the prefetched data line is brought into assist cache 23 from main memory 11, the reference (R) bit in column 47 for the new data line is cleared, indicating the prefetched data line was unreferenced.

Data lines are transmitted from main memory 11, across bus 10 to processor 12. In the preferred embodiment, bus 10 is 64 bits wide and each data line is 256 bits wide. Therefore, four bus cycles are required for an entire data line to be transmitted to processor 12. To minimize impact on processor execution time, each data line is consolidated in move-in buffer 48 until data transmission across bus 10 is complete. When the entire data line has been transferred to move-in buffer 48, the data line is written into SRAM 43 in a single cycle. Thus, assist cache 23 is available to processor 12 a greater proportion of time.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computing system, a method for buffering data stored in a main memory and utilized by a processor, the method comprising the steps of:
   (a) transferring data lines from the main memory to a first cache, including the substep of:
      (a.1) storing with each data line in the first cache an indication which indicates a destination for the data line when the data line is moved out of the first cache, the indication indicating whether the data line will be forwarded to a second cache or whether the data line will be returned to the main memory;
   (b) when a first data line is moved out of the first cache, and the indication indicates the first data line is to be forwarded to the second cache, moving the first data line to the second cache;
   (c) when a second data line is moved out of the second cache and is dirty, returning the second data line to the main memory; and,
   (d) when the processor requests access to a third data line, searching the first cache and the second cache in parallel for the third data line.

2. A method as in claim 1 wherein step (d) comprises the substeps of:
   (d.1) generating an index into the second cache;
   (d.2) using the index to access a fourth data line within the second cache;
   (d.3) comparing a tag for the fourth data line with a tag for the third data line to determine whether the fourth data line is the third data line; and,
   (d.4) checking a tag for every data line stored in the first data cache to determine whether any data line in the first data cache is the third data line; wherein step (d.4) is performed in parallel to the performance of steps (d.1) through (d.3).

3. A method as in claim 1 wherein data lines within the first cache are managed first-in-first-out so that in step (b) the first data line at the time the first data line is moved out of the first cache has been in the first cache longer than any other data line in the first cache.

4. A method as in claim 1 wherein step (b) includes the substep of:
   (b.1) when the first cache contains more than a predetermined number of data lines, along with the first data line moving an additional data line from the first cache.

5. A method as in claim 4 wherein in step (b.1), when the additional data line maps a same location in the second cache as does the first data line, moving the second data line to the main memory.

6. A method as in claim 1, additionally comprising the step of:
   (e) when in step (d) the third data line is not in the first cache and is not in the second cache, transferring the third data line from the main memory to the first cache including the following substeps:

(i) marking, in the first cache, the third data line as referenced;

(ii) prefetching a fourth data line from main memory to the first cache; and, (iii) marking, in the first cache, the fourth data line as unreferenced.

7. A method as in claim 6 wherein step (e) additionally comprises the substep of:

(iv) when the processor requests access to the fourth data line, performing the following substeps, marking, in the first cache, the fourth data line as referenced, prefetching a fifth data line from main memory to the first cache, and marking, in the first cache, the fifth data line as unreferenced.

8. A cache system for buffering data stored in a main memory and utilized by a processor, the cache system comprising:

a first cache including
data line storage for storing data lines, and
storing means for storing with each data line stored in the data line storage an indication which indicates a destination for the data line when the data line is moved out of the first cache;

a second cache;

first transfer means, coupled to the first cache and to the main memory, for transferring data lines from the main memory to the first cache;

second transfer means, coupled to the first cache, the second cache and the main memory, for transferring data lines from the first cache to the second cache and from the first cache to the main memory, wherein the destination for any first data line moved from the first cache is dependent on a value of the indication for the first data line stored within the storing means;

third transfer means, coupled to the second cache and to the main memory means, for transferring data lines from the second cache to the main memory; and, access means for accessing the first cache and the second cache in parallel.

9. A cache system as in claim 8, wherein the access means comprises:

index generation means, coupled to the second cache, for generating an index into the second cache;

comparison means, coupled to the second cache, for comparing a tag for a data line accessed by the index generated by the index generation mean with a tag for a desired data line; and, associative comparing means, coupled to the first cache for determining whether any data line in the first data cache is the desired data line.

10. A cache system as in claim 8 wherein the data line storage is a first-in-first-out memory.

11. A cache system as in claim 8 wherein the second transfer means moves out from the first cache two data lines at a time when the first cache contains more than a predetermined number of data lines.

12. A cache system as in claim 11 wherein when the second transfer means is moving out from the first cache two data lines which map to a same location in the second cache, the second transfer means will move one of the two data lines to the main memory.

13. A cache system for buffering data stored in a main memory and utilized by a processor, the cache system comprising:

a first cache, the first cache being fully associative;

a second cache, the second cache being directly mapped;

first transfer means, coupled to the first cache and to the main memory, for transferring data lines from the main memory to the first cache;

second transfer means, coupled to the first cache, the second cache and the main memory, for transferring data lines from the first cache to the second cache;

third transfer means, coupled to the second cache and to the main memory means, for transferring data lines from the second cache to the main memory; and, access means for accessing the first cache and the second cache in parallel.

14. A cache system as in claim 13, wherein the access means comprises:

index generation means, coupled to the second cache, for generating an index into the second cache;

comparison means, coupled to the second cache, for comparing a tag for a data line accessed by the index generated by the index generation mean with a tag for a desired data line; and, associative comparing means, coupled to the first cache for determining whether any data line in the first data cache is the desired data line.

15. A cache system as in claim 13 wherein first cache includes:

data line storage for storing data lines; and, content addressable memory for storing tags for the data lines stored in the data line storage.

16. A cache system as in claim 15 wherein the data line storage is a first-in-first-out memory.

17. A cache system as in claim 15 wherein the first cache additionally includes storing means for storing with each data line stored in the data line storage an indication which indicates a destination for the data line when the data line is moved out of the first cache.

18. A cache system as in claim 13 wherein the second transfer means moves out from the first cache more than one data line at a time when the first cache contains more than a predetermined number of data lines.

19. A cache system as in claim 18 wherein when the second transfer means is moving out from the first cache two data lines which map to a same location in the second cache, the second transfer means will move one of the two data lines to the main memory.

20. A cache system as in claim 13 wherein the first cache includes storing means for storing with each data line stored in the data line storage an indication which indicates whether the data line has been referenced.

21. A cache system as in claim 20 wherein the first transfer means is additionally for marking, in the first cache, first data lines as referenced when the first data lines are brought into the first cache as a result of a reference to the first data lines, and for marking, in the first cache, second data lines as unreferenced when the second data lines are brought into the first cache as a result of a prefetch.

22. A cache system as in claim 21 wherein the access means is additionally for marking, in the first cache, the second data lines as referenced when the seconds data lines are referenced.

23. In a computing system, a method for buffering data stored in a main memory and utilized by a processor, the method comprising the steps of:

(a) transferring data lines from the main memory to a first cache, so that when a first data line is moved from the main memory to the first cache, the first data line is not simultaneously moved to a second cache;

(b) when a first data line is moved out of the first cache, moving the first data line to the second cache;

(c) when a second data line is moved out of the second cache and is dirty, returning the second data line to the main memory; and, (d) when the processor requests access to a third data line, searching the first cache and the second cache in parallel for the third data line.

24. A method as in claim 23 wherein step (d) comprises the substeps of:

(d.1) generating an index into the second cache;

(d.2) using the index to access a fourth data line within the second cache;

(d.3) comparing a tag for the fourth data line with a tag for the third data line to determine whether the fourth data line is the third data line; and, (d.4) checking a tag for every data line stored in the first data cache to determine whether any data line in the first data cache is the third data line; wherein step (d.4) is performed in parallel to the performance of steps (d.1) through (d.3).

25. A method as in claim 23 wherein data lines within the first cache are managed first-in-first-out so that in step (b) the first data line at the time the first data line is moved out of the first cache has been in the first cache longer than any other data line in the first cache.

26. A method as in claim 23 wherein step (b) includes the substep of:

(b.1) when the first cache contains more than a predetermined number of data lines, along with the first data line moving an additional data line from the first cache.

27. A method as in claim 26 wherein in step (b.1), when the additional data line maps a same location in the second cache as does the first data line, moving the first data line to the main memory.

28. A method as in claim 23, additionally comprising the step of:

(e) when in step (d) the third data line is not in the first cache and is not in the second cache, transferring the third data line from the main memory to the first cache including the following substeps:

(i) marking, in the first cache, the third data line as referenced;

(ii) prefetching a fourth data line from main memory to the first cache; and, (iii) marking, in the first cache, the fourth data line as unreferenced.

29. A method as in claim 28 wherein step (e) additionally comprises the substep of:

(iv) when the processor requests access to the fourth data line, performing the following substeps, marking, in the first cache, the fourth data line as referenced, prefetching a fifth data line from main memory to the first cache, and marking, in the first cache, the fifth data line as unreferenced.

* * * * *